(12) United States Patent
Anderson et al.

(10) Patent No.: US 9,254,922 B2
(45) Date of Patent: Feb. 9, 2016

(54) HYBRID CLUTCH ASSEMBLY FOR AN AIRCRAFT

(71) Applicant: Embry-Riddle Aeronautical University, Inc., Daytona Beach, FL (US)

(72) Inventors: Richard Anderson, Daytona Beach, FL (US); Charles N. Eastlake, Daytona Beach, FL (US); Matt Gonitzke, Daytona Beach, FL (US); Glenn P. Greiner, Daytona Beach, FL (US)

(73) Assignee: Embry-Riddle Aeronautical University, Inc., Daytona Beach, FL (US)

( * ) Notice: Subject to any disclaimer, the term of this patent is extended or adjusted under 35 U.S.C. 154(b) by 392 days.

(21) Appl. No.: 13/785,605

(22) Filed: Mar. 5, 2013

(65) Prior Publication Data

US 2014/0060995 A1 Mar. 6, 2014

Related U.S. Application Data

(60) Provisional application No. 61/606,754, filed on Mar. 5, 2012, provisional application No. 61/606,751, filed on Mar. 5, 2012.

(51) Int. Cl.
*B64D 35/08* (2006.01)
*F01B 21/00* (2006.01)
(Continued)

(52) U.S. Cl.
CPC ............... *B64D 35/08* (2013.01); *B60W 20/40* (2013.01); *B64D 27/24* (2013.01); *F01B 21/00* (2013.01); *B64D 2027/026* (2013.01); *Y02T 50/64* (2013.01); *Y10S 903/902* (2013.01)

(58) Field of Classification Search
CPC .... B64D 2027/026; B64D 35/08; B60K 6/38; B60K 6/383
See application file for complete search history.

(56) References Cited

U.S. PATENT DOCUMENTS 2,007,878 A 7/1935 Schulman
2,604,276 A 7/1952 Huben
(Continued)

OTHER PUBLICATIONS

International Search Report and Written Opinion for related PCT application, No. PCT/US/2013/037409, mailed Mar. 25, 2014.
(Continued)

*Primary Examiner* — Nicholas McFall
(74) *Attorney, Agent, or Firm* — Womble Carlyle Sandridge & Rice LLP

(57) ABSTRACT

A hybrid clutch assembly inserted between an internal combustion engine and the propeller of an aircraft to provide a hybrid-powered aircraft. The hybrid clutch assembly allows a direct current (DC) electric motor to be attached to the hybrid clutch assembly using drive belts. The hybrid clutch assembly allows the internal combustion engine to transmit power to the aircraft's propeller and freely spin the DC motor. The DC motor can transmit power to the aircraft's propeller without turning the internal combustion engine. The hybrid clutch assembly independently allows either the internal combustion engine or the DC motor in parallel to power the aircraft's propeller. The hybrid clutch assembly includes a hybrid clutch, a drive belt housing, a hybrid clutch assembly shaft, and an adapter plate. The hybrid clutch connects to the drive belt housing a hybrid clutch assembly shaft. The adapter plate enables connection of the hybrid clutch to the internal combustion engine propeller flange. The drive belt housing enables connection of the hybrid clutch to the propeller. The DC motor is connected to the drive belt housing drive belts.

22 Claims, 6 Drawing Sheets

(51) Int. Cl.
*B64D 27/24* (2006.01)
*B60W 20/00* (2006.01)
*B64D 27/02* (2006.01)

(56) References Cited

U.S. PATENT DOCUMENTS

| | | | |
|---|---|---|---|
| 3,084,889 A | 4/1963 | Irbitis | |
| 4,998,995 A | 3/1991 | Blythe | |
| 5,743,489 A | 4/1998 | Stemme | |
| 6,550,719 B2 | 4/2003 | Konig | |
| 7,231,997 B2 | 6/2007 | De Roche | |
| 2008/0166934 A1 | 7/2008 | Levander et al. | |
| 2008/0184906 A1 | 8/2008 | Kejha | |
| 2010/0083631 A1 | 4/2010 | Foster et al. | |
| 2010/0188304 A1 | 7/2010 | Clymer et al. | |
| 2011/0168118 A1* | 7/2011 | Li et al. | 123/179.25 |
| 2012/0025032 A1 | 2/2012 | Hopdjanian et al. | |
| 2012/0209456 A1* | 8/2012 | Harmon et al. | 701/3 |

OTHER PUBLICATIONS

Invitation to Pay Additional Fees and, where Applicable, Protest Fee dated Jan. 23, 2014 in PCT/US2013/037409 filed Apr. 19, 2013.

* cited by examiner

HYBRID CLUTCH ASSEMBLY FOR AN AIRCRAFT

CROSS-REFERENCE TO RELATED APPLICATIONS

This application claims the benefit of U.S. Provisional Patent Application Ser. No. 61/606,754 filed on Mar. 5, 2012 and U.S. Provisional Patent Application Ser. No. 61/606,751 filed on Mar. 5, 2012. The specification and drawings of the provisional patent applications are specifically incorporated by reference herein. This application is related to co-pending and commonly assigned U.S. application Ser. No. 13/785,737 filed concurrently herewith.

TECHNICAL FIELD

Embodiments of the invention generally relate to hybrid aircraft and, more specifically, to hybrid power systems that are connected through a hybrid clutch assembly and that can operate independently of each power source during powered flight.

BACKGROUND

Propeller driven airplanes traditionally rely upon an internal combustion engine to power the propeller. The internal combustion engine is fueled by petroleum which emits carbon dioxide into the atmosphere. To reduce the dependency on petroleum fuel and its byproduct emission into the atmosphere, alternative propulsion means, such as electric motors, are being researched. This alternative device needs to provide sufficient power, at a minimum, to sustain level cruise flight. This alternative device should also be capable of addition to an existing airplane as an independent power system.

Having an alternative power source will reduce the petroleum fuel consumed in addition to reducing the airplane's noise. The duration of the flight using the electric motor system will be dependent upon the capacity of the battery system.

SUMMARY

The embodiments disclosed are directed to a hybrid clutch assembly for a hybrid airplane that can be powered by either an internal combustion engine or an electric motor. The two power systems function independently of one another, but are interconnected through the hybrid clutch assembly to power the propeller. The two systems are interconnected such that the internal combustion engine could power the propeller independently of the electric motor, and the electric motor could power the propeller independently of the internal combustion engine. This can be achieved using a hybrid clutch assembly that allows the two systems to operate in parallel.

The hybrid clutch assembly has a belt housing that allows an electric motor to be connected to it. This electric motor then can be connected to the internal combustion engine using brackets and turnbuckles. The electric motor is connected to the hybrid clutch assembly by drive belts.

In an exemplary embodiment, a hybrid clutch assembly is inserted between an internal combustion engine and the propeller of an aircraft to provide a hybrid-powered aircraft. The hybrid clutch assembly allows a direct current (DC) electric motor to be attached to the hybrid clutch assembly using drive belts. The hybrid clutch assembly allows the internal combustion engine to transmit power to the aircraft's propeller and freely spin the DC motor. The DC motor can transmit power to the aircraft's propeller without turning the internal combustion engine. The hybrid clutch assembly independently allows either the internal combustion engine or the DC motor in parallel to power the aircraft's propeller.

The hybrid clutch assembly, in an exemplary embodiment, includes a hybrid clutch, drive belt housing, a hybrid clutch assembly shaft, and an adapter plate. The hybrid clutch is connected to the drive belt housing a hybrid clutch assembly shaft. The adapter plate enables connection of the hybrid clutch to the internal combustion engine propeller flange. The drive belt housing enables connection of the hybrid clutch to the propeller. The DC motor is connected to the drive belt housing drive belts.

BRIEF DESCRIPTION OF THE DRAWINGS

These and other advantages and aspects of the embodiments of the disclosure will become apparent and more readily appreciated from the following detailed description of the embodiments taken in conjunction with the accompanying drawings, as follows.

DETAILED DESCRIPTION

Figure 1:
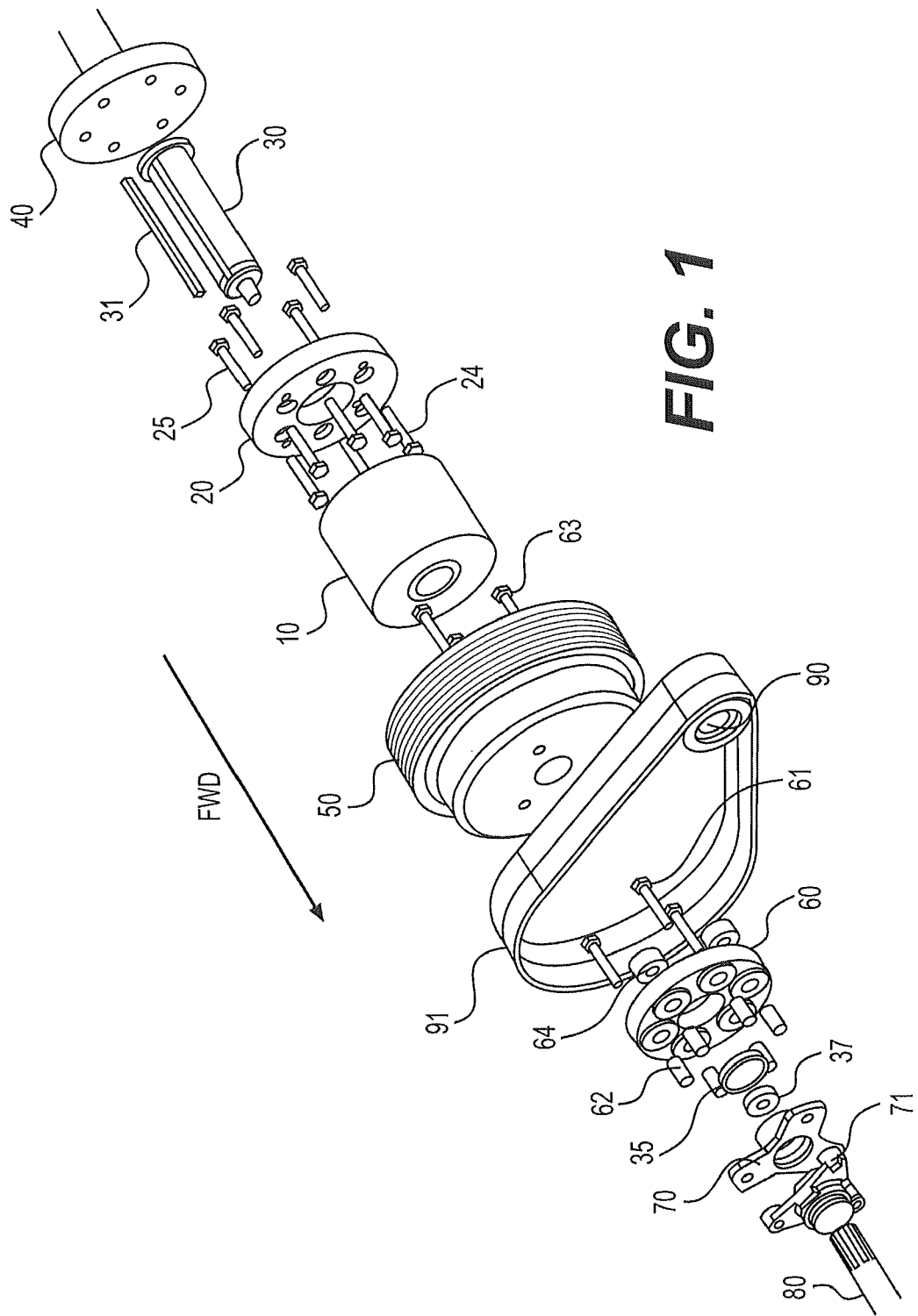
FIG. 1 illustrates an exploded view of the hybrid clutch assembly in accordance with an exemplary embodiment.

The following detailed description is provided as an enabling teaching of embodiments of the invention. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the invention and not in limitation thereof, since the scope of the invention is defined by the claims.

This application is related to co-pending and commonly assigned U.S. application Ser. No. 13/785,737 filed concurrently herewith. The co-pending patent application is hereby incorporated by reference in its entirety into this description.

Embodiments of the invention are directed to hybrid-powered aircraft that include both an internal combustion engine and a direct current (DC) motor. The system allows power transmission from either the internal combustion engine or the DC motor in parallel. The operator of the aircraft can switch back and forth between the internal combustion engine and the DC motor in flight or on the ground. The electric motor spins freely while the internal combustion engine transmits power to the propeller and the internal combustion engine is bypassed while the DC motor transmits power to the propeller. To increase the redundancy of the system, two drive belts are used to transmit power from the DC motor to the propeller. The hybrid clutch assembly, in exemplary embodiments, provides a method of transmitting power independently from an internal combustion engine or a direct current (DC) electric motor to the same propeller or propeller drive shaft.

In one embodiment, a hybrid clutch assembly can be inserted between an internal combustion engine and the propeller of an aircraft to provide a hybrid-powered aircraft. The hybrid clutch assembly allows a direct current (DC) electric motor to be attached to the hybrid clutch assembly using drive belts. The hybrid clutch assembly enables the internal combustion engine to transmit power to the aircraft's propeller and freely spin the DC motor. The DC motor can transmit power to the aircraft's propeller without turning the internal combustion engine. The hybrid clutch assembly independently allows either the internal combustion engine or the DC motor in parallel to power the aircraft's propeller.

The hybrid clutch assembly contains a hybrid clutch, a drive belt housing, a hybrid clutch assembly shaft and an adapter plate. The hybrid clutch is connected to the drive belt housing a hybrid clutch assembly shaft. The adapter plate allows for the connection of the hybrid clutch to the internal combustion engine propeller flange. The drive belt housing allows for the connection of the hybrid clutch to the propeller. The drive belt housing also allows the DC motor to be connected to the drive belt housing drive belts.

FIG. 1 illustrates an exploded view of the hybrid clutch assembly in an exemplary embodiment. This view details the hybrid clutch assembly that can be inserted between the internal combustion engine and a propeller drive shaft. The hybrid clutch 10 could be a commercially available off-the-shelf component having an outer race and an inner race. When the outer race of the hybrid clutch rotates clockwise, the inner race rotates clockwise. When the inner race rotates clockwise, the outer race does not rotate. This is the fundamental operation of a hybrid clutch.

Figure 2:
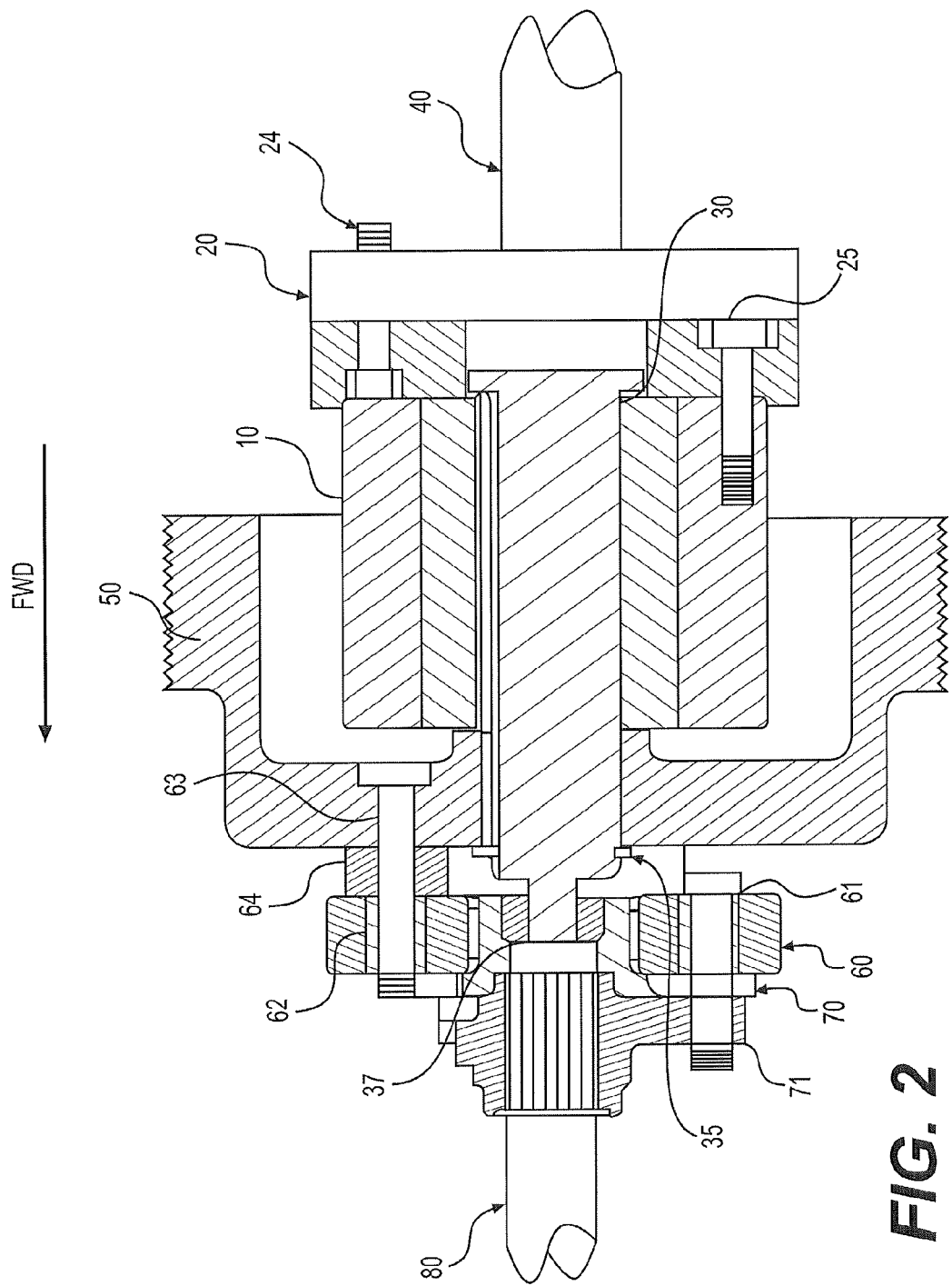
FIG. 2 illustrates a cross-sectional view of the hybrid clutch assembly in accordance with an exemplary embodiment.

With further reference to FIGS. 1-2, a clutch-flange adapter plate 20 connects the bolt pattern of engine propeller flange plate 40 to the outer race bolt pattern of the clutch. The clutch-flange adapter plate 20 also functions as a forward offset to properly align the drive belt housing 50 with the DC motor pulley 90. The clutch-flange adapter plate 20 has countersunk slots on the forward side to receive the flange bolts 24 whose hexagonal heads are seated into the slots to attach the hybrid clutch assembly to the engine propeller flange plate 40. The flange bolts 24 are inserted prior to the clutch-flange adapter plate 20 being bolted to the aft side of the hybrid clutch 10 using clutch bolts 25. A hardened square keyway 31 in pressed into a keyway cutout of the hybrid clutch assembly shaft 30, then pushed through the clutch-flange adapter plate 20 and slid into the hybrid clutch 10 until the aft collar 33 of the hybrid clutch assembly shaft 30 is flush with the inner race of the hybrid clutch 10.

The drive belt housing 50 includes a bored out inner collar to match the diameter of the hybrid clutch assembly shaft 30 that includes a square keyway cutout 52 to match the hardened square keyway 31. The inner diameter of the drive belt housing 50 is greater than the outer diameter of the hybrid clutch 10 providing sufficient clearance and airflow circulation. The outer diameter of the drive belt housing 50 provides the correct revolutions per minute (rpm) transmission from the DC motor pulley 90 to the propeller shaft 80. Drive belt grooves are also positioned on the drive belt housing 50 providing additional flexibility for proper alignment with the DC motor pulley 90.

The flex disc coupler bolts 61 are inserted through the flex disc 60 with their inserts 62 prior to flex disc 60 being mounted to the drive belt housing 50. The flex disc 60 is a standard aircraft part. Flex disc housing bolts 63 are then inserted into the drive belt housing 50 followed by the flex disc-housing spacers 64 in order to offset the flex disc 60 from the drive belt housing 50. This provides clearance for the hexagonal heads of the flex disc coupler bolts 61. The flex disc 60 is then slid onto the flex disc housing bolts 63 with their inserts 62. Proper nuts (not shown) are added to the flex disc housing bolts 63 and tightened to the required torque specification.

The drive belt housing 50 and flex disc 60 assembly is then slid onto the hybrid clutch assembly shaft 30 aligning its keyway insert to the shaft's hardened square keyway 31. This assembly is secured with a snap ring 35. A spherical ball bushing 37 is then inserted onto the end of the collar of the hybrid clutch assembly shaft 30 providing centering capability for the coupler centering hub 70. The coupler centering hub 70 and the spline coupler 71 are standard aircraft parts and are slid onto the flex disc coupler bolts 61 with proper nuts (not shown) and tightened to the required torque specifications. This structure completes the hybrid clutch assembly.

The hybrid clutch assembly flange bolts 24 are used to mount the hybrid clutch assembly onto the engine propeller flange 40 with proper nuts (not shown) and tightened to the required torque specifications. The DC motor pulley 90 must be adjustable towards the drive belt housing 50 allowing the drive belts 91 to be slipped over the drive belt housing 50 and DC motor pulley 90. Next, the electric DC motor pulley 90 is adjusted away from the drive belt housing 50 providing proper belt tension. The spline of propeller drive shaft 80 is then inserted into the spline coupler 71. This interconnects the engine and DC motor in parallel with the propeller drive shaft 80.

FIG. 2 illustrates a cross-sectional view of the hybrid clutch assembly in an exemplary embodiment. The hybrid clutch 10 is the central component with the flange bolts 24 inserted into the adapter plate 20 prior to the clutch bolts 25 attaching the adapter plate 20 to the outer race of the hybrid clutch 10. The flex disc coupler bolts 61 and inserts 62 are slid into the flex disc 60 prior to the housing bolts 63 being inserted into the drive belt housing 50 followed by the spacers 64 and flex disc 60. The hybrid clutch assembly shaft 30 and keyway 31 interconnect the inner race of the hybrid clutch 10 with the drive belt housing 50 and flex disc 60. The snap ring 35 secures these items onto the hybrid clutch assembly shaft 30. The bearing 37 is placed on the end of the shaft 30 and then the spline coupler 71 and centering couplers 70 are slid onto the flex disc coupler bolts 61 and secured with nuts (not shown). Next, the hybrid clutch assembly flange bolts 24 are inserted into the holes of engine propeller flange plate 40 and secured. The drive belts 91 are added and tensioned followed by the propeller drive shaft 80 being slid into the spline coupler 71.

Once the propeller is attached to the propeller drive shaft 80, the propeller can be rotated in a clockwise direction to ensure the drive belt housing 50, drive belts 91, and DC motor pulley 90 rotate freely. Rotation of the propeller in a counter-clockwise rotation should lock the hybrid clutch and rotate the engine.

Figure 3:
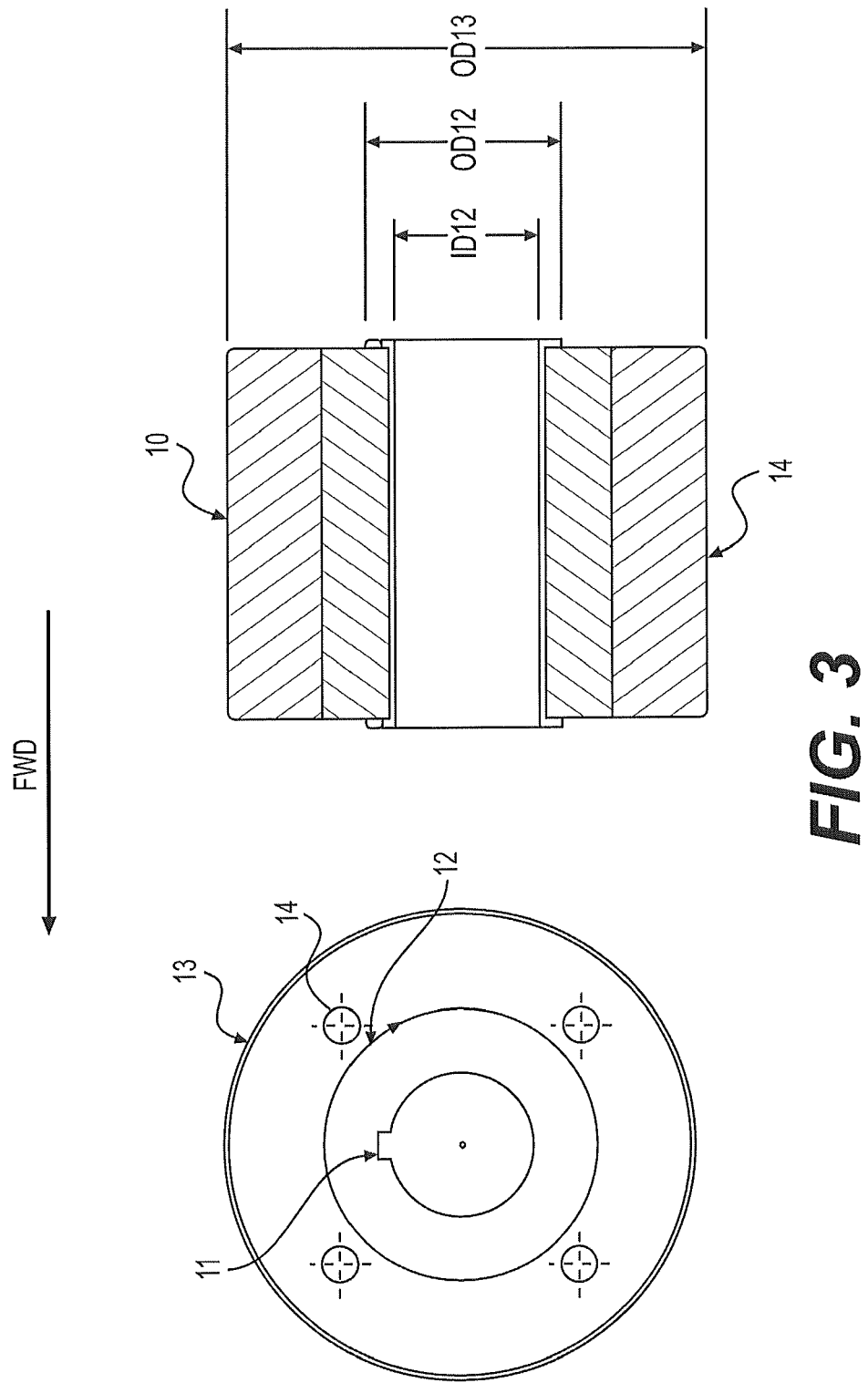
FIG. 3 illustrates a generic view of a typical commercially available off-the-shelf hybrid clutch that can be used in exemplary embodiments.

FIG. 3 illustrates the structure of a commercially available off-the-self hybrid clutch. The hybrid clutch internal mechanism varies and may be oil-filled for lubrication of the internal mechanisms. The hybrid clutch can have an inner race 12 and an outer race 13. As the inner race 12 rotates clockwise the outer race 13 will not rotate. Hence, the term hybrid clutch. As the outer race 13 rotates clockwise the internal mechanisms will lock the inner race 12 causing it to rotate clockwise. This figure shows free rotation of the inner race 12 in a clockwise direction looking at the aft side of the hybrid clutch 10 in a forward direction. This rotation is in the proper direction for the propeller to produce thrust. The inner race 12 has an inner diameter, designated as ID12, with a square keyway slot 11 for the hybrid clutch assembly shaft 30 and its square keyway 31 to be slid into. The inner race 12 has an outer diameter designated as OD12. The hybrid clutch 10 has mounting holes 14 on the aft side of the outer race 13. The mounting holes 14 allow the flange bolts 25 to mount the clutch-flange adapter plate 20 to the hybrid clutch 10. The outer race 13 of hybrid clutch 10 has an outside diameter designated as OD13.

Figure 4:
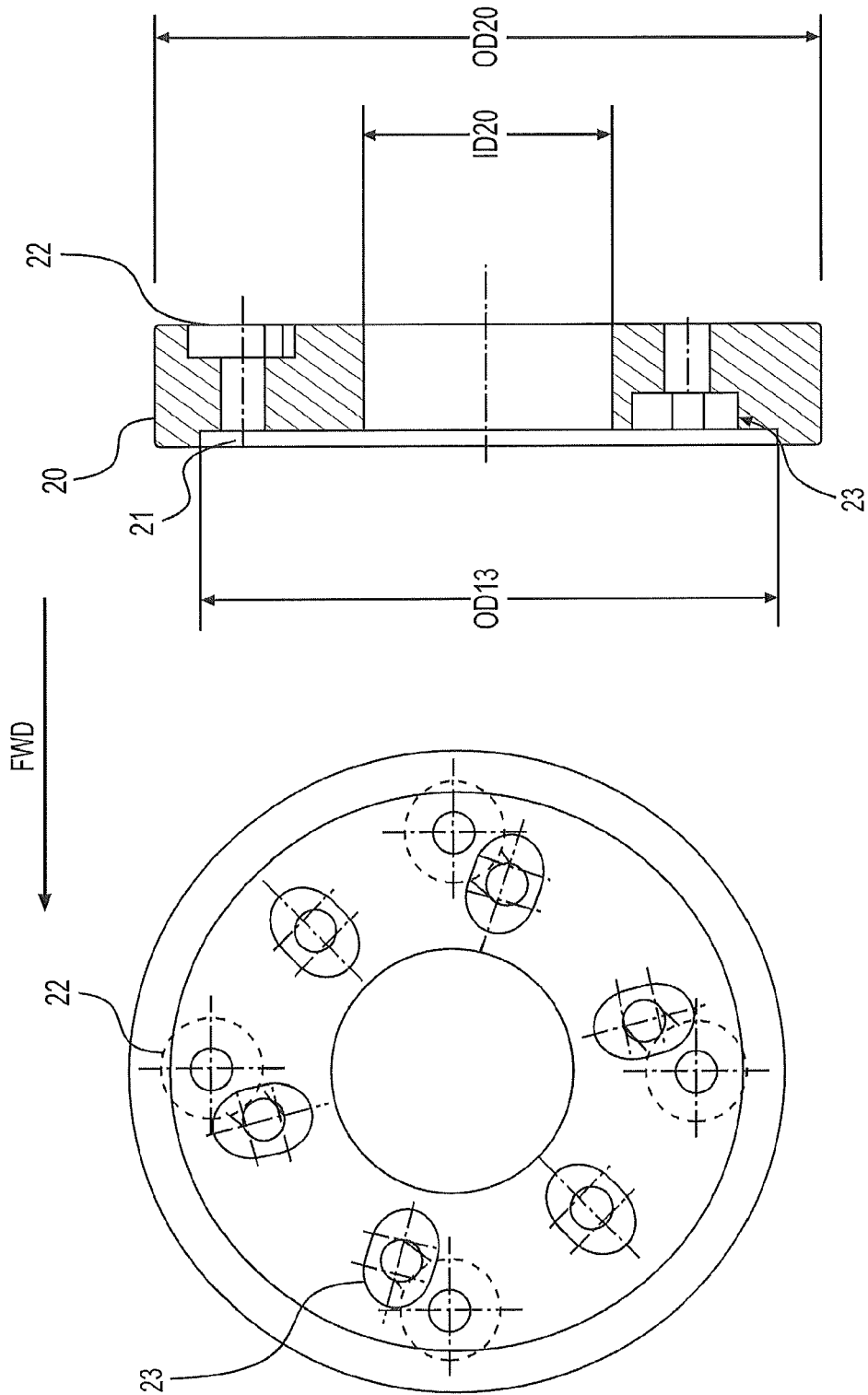
FIG. 4 illustrates a detail view of the adapter plate that is needed to interconnect the internal combustion engine propeller flange to the hybrid clutch outer race in accordance with an exemplary embodiment.

FIG. 4 illustrates the clutch-flange adapter plate 20 that enables the interconnection of the hybrid clutch assembly, in particular, the hybrid clutch 10 to the internal combustion engine propeller flange 40 in an exemplary embodiment. The minimum thickness of the clutch-flange adapter plate 20 must be sufficient such that the heads of flange bolts 24 and the heads of clutch bolts 25 are countersunk into the clutch-flange adapter plate 20 providing a flush mount on both sides. The outside diameter of the clutch-flange adapter plate 20, designated OD20, should be the same diameter as the diameter of internal combustion engine propeller flange 40. The clutch-flange adapter plate 20 has an inner diameter, designated ID20, which is larger than the collar of hybrid clutch assembly shaft 30. The collar is labeled with reference number 33 in FIG. 6. The clutch-flange adapter plate 20 has a recess bore, designated as OD13, that is slightly larger than the outside diameter of the hybrid clutch 10 providing proper centering and alignment. Countersink slots 23 enable the hexagonal head flange bolts 24 to be securely seated in place. The flange bolts 24 must be inserted into the clutch-flange adapter plate 20 prior to mounting the clutch-flange adapter plate 20 to the hybrid clutch 10. The diameter of the countersink holes 22 must be wide enough for the hexagonal head and socket of clutch bolts 25 to fit in order to securely mount the clutch-flange adapter plate 20 onto the hybrid clutch 10. A thread locking solvent should be used on the clutch bolts 25 and the bolts should be tightened to the required torque specifications. This creates the clutch-adapter assembly in exemplary embodiments.

Figure 5:
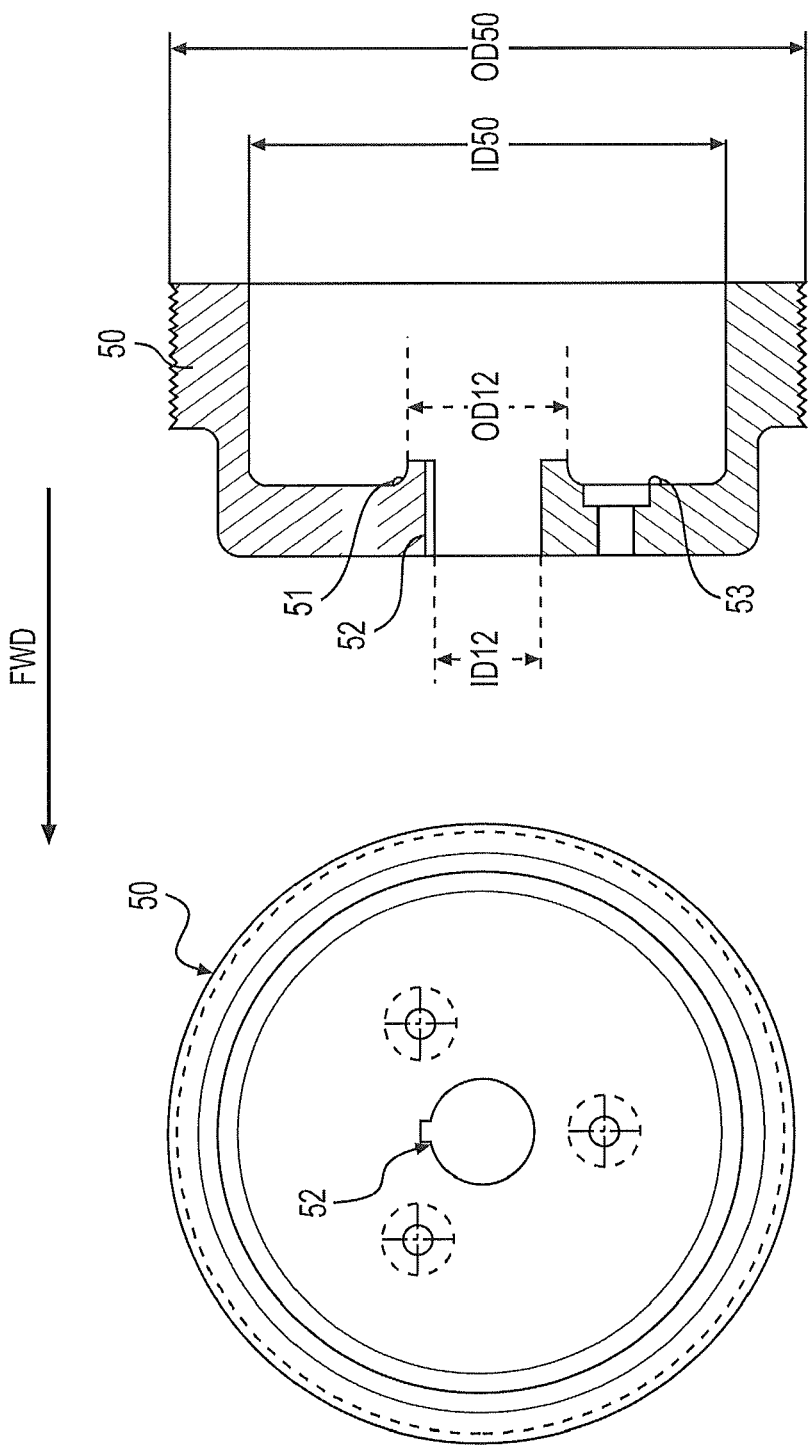
FIG. 5 is a detail view of the drive belt housing that interconnects the electric DC motor to the hybrid clutch assembly shaft in accordance with an exemplary embodiment.

FIG. 5 illustrates the drive belt housing 50 that transmits power from the DC motor pulley 90 using drive belts 91 to rotate the propeller driveshaft 80 in an exemplary embodiment. The drive belt housing 50 has an internal diameter, designated by ID50, which must be larger than the outside diameter OD13 of hybrid clutch 10. This clearance allows air circulation between the drive belt housing 50 and the hybrid clutch 10. The drive belt housing 50 has an inner collar 51 with an internal diameter, designated as ID12, and a square keyway 52 that is slid onto the hybrid clutch assembly shaft 30 and aligned with its square keyway 31. The outside diameter of drive belt housing 50, designated as OD50, in conjunction with the diameter of DC motor pulley 90 provides the desired rotational speed of the propeller shaft 80. The drive belt housing collar 51 provides sufficient separation between the drive belt housing 50 and the hybrid clutch 10. This separation provides additional clearance between the flex disc housing bolts 63 and the hybrid clutch 10. Since the flex disc bolts 63 are recessed into the drive belt housing 50, the countersinks 53 must provide sufficient access for the hexagonal head and socket of flex disc housing bolt 63 to fit. This creates the flex-disc-housing assembly.

Figure 6:
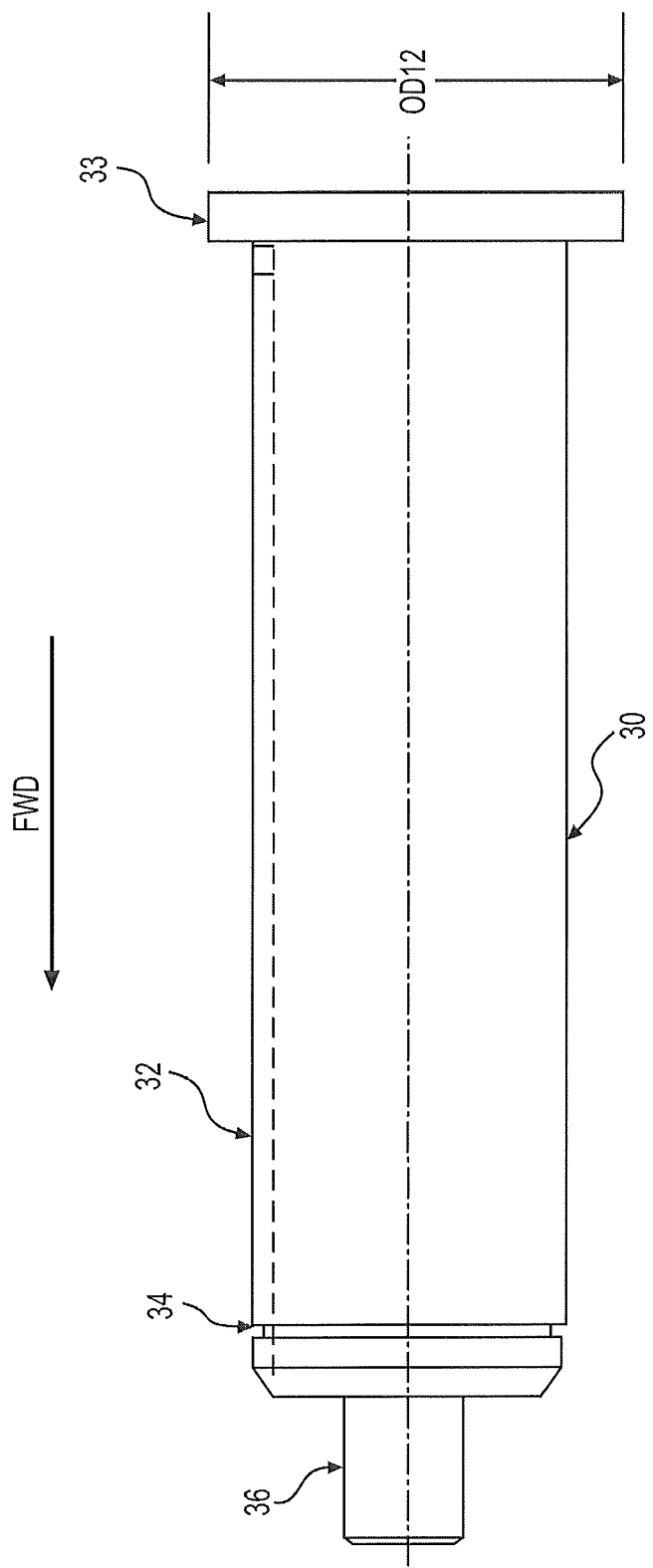
FIG. 6 illustrates a detail view of the hybrid clutch assembly shaft that interconnects the hybrid clutch to the drive belt housing in accordance with an exemplary embodiment.

FIG. 6 illustrates the hybrid clutch assembly shaft 30 having a keyway slot along its length 32 for a hardened square keyway 31 that interlocks the clutch-adapter assembly and the flex-disc-housing assembly in an exemplary embodiment. The diameter of the collar 33 of hybrid clutch assembly shaft 30, designated as OD12, should be the same diameter as the outer diameter OD12 of inner race 12 of hybrid clutch 10. The inner diameter ID20 of adapter plate 20 must be larger than the diameter OD12 of collar 33 of hybrid clutch assembly shaft 30. A snap ring 35 installed in the groove 34 at the forward end of the hybrid clutch assembly shaft 30 secures the hybrid clutch assembly. There is also a collar 36 at this end of the shaft 30 for the spherical ball bushing 37 to be seated. This provides additional alignment for the coupler centering hub 70 and spline 71 when attached to the flex disc 60.

The hybrid clutch assembly shaft 30 with hardened square keyway 31 is slid through the inner diameter ID20 of adapter plate 20 into the clutch-adapter assembly aligning the keyways until the collar 33 of hybrid clutch assembly shaft 30 is flush with the inner race 12 of hybrid clutch 10. The flex-disc-housing assembly is then slid onto the hybrid clutch assembly shaft 30 until the inner collar 51 of drive belt housing 50 is flush with the hybrid clutch 10. The clutch assembly groove 34 at the forward end of the hybrid clutch assembly shaft 30 should be flush with the drive belt housing 50 allowing the snap ring 35 to be installed. The spherical ball bushing 37 is then seated onto the collar 36 of hybrid clutch assembly shaft 30.

To complete the hybrid clutch assembly, the coupler centering hub 70 is slid onto the flex disc coupler bolts 61 that are protruding through the flex disc 60 that will encapsulate the spherical ball bushing 37. The propeller spline coupler 71 is then slid onto the flex disc coupler bolts 61 and proper nuts (not shown) are added and tightened to the required torque specifications.

In exemplary embodiments, following completion of the hybrid clutch assembly process, the hybrid clutch assembly is bolted to the engine propeller flange 40 using the exposed flange bolts 24. Nuts are added and tightened to the required torque specifications. The DC motor 90 is rotated towards the hybrid clutch assembly and the drive belts 91 are slid over the drive belt housing 50 and the DC motor pulley 90. The DC motor is then adjusted away from the hybrid clutch assembly providing proper belt tension. The spline of propeller shaft 80 is then inserted into the spline coupler 71 completing the assembly process.

In alternate embodiments, if space is not a concern, the drive belt housing 50 illustrated in FIGS. 1, 2, and 5 can be sized differently to account for various desired rotational speeds at the propeller shaft 80 based on the diameter of DC motor pulley 90. The number of belts, type of belt, and tooth pattern for drive belts 91 can all vary.

In some embodiments, the propeller shaft 80 may need to be shortened to accommodate the length of the hybrid clutch assembly. The DC motor in these embodiments can be positioned differently than illustrated in the figures due to space limitation. The propeller shaft 80 may be eliminated if the aircraft's propeller is to be directly connected to the hybrid clutch assembly. These and other alternative embodiments may allow the hybrid clutch assembly to be installed requiring minimum alterations to the aircraft.

In operation, the internal combustion engine transmits power to the propeller of an aircraft to takeoff and climb to cruising altitude. Once at cruising altitude, the DC motor battery management system can be activated. As the internal combustion engine power is reduced, the battery management system power for the DC motor is increased. Once the DC motor is at the power required to maintain level flight, altitude, and speed, the internal combustion engine can be turned off. The process can be reversed so as to transition from operating the DC motor to operating the internal combustion engine. The DC motor throttle in the cockpit is decreased and the internal combustion engine is restarted allowing the DC motor battery management system to be turned off.

The process of alternating power from the internal combustion engine to DC motor and back to the internal combustion engine can be repeated multiple times in the air or on the ground. The operation of the DC motor is dependent upon the available power from the battery management system. Due to the battery system's charging voltage requirement, the battery system can be recharged in flight by the alternator of the internal combustion engine. Either the internal combustion engine or the DC motor can be used for the descent and landing portion of the flight.

The disclosed embodiments of the hybrid clutch assembly allow an internal combustion engine and a DC motor, operating in parallel, to independently transmit power to the aircraft's propeller. In doing so, the internal combustion engine will freely spin the DC motor with little loss of power when the engine's power is transmitted to the propeller. The DC motor transmits its power to the propeller bypassing the internal combustion engine with little loss of power.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiments are possible without departing from the scope of the present invention. In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the invention is defined solely by the appended claims.

What is claimed:

1. A hybrid clutch assembly for an aircraft having a hybrid propulsion system powered in parallel by an internal combustion engine and an electric motor, the hybrid clutch assembly comprising:
    a drive belt housing connecting the internal combustion engine and the electric motor to a propeller driveshaft for providing power to a propeller of the aircraft;
    a hybrid clutch assembly shaft coupled with the drive belt housing;
    a hybrid clutch comprising an inner race and an outer race and connected to the drive belt housing by the hybrid clutch assembly shaft; and
    a clutch flange adapter plate connecting the hybrid clutch to an engine propeller flange of the internal combustion engine for transmitting power from the internal combustion engine to the drive belt housing, and configured to define an offset for aligning the drive belt housing with a motor pulley coupled to the electric motor for transmitting power from the electric motor to the drive belt housing.

2. The hybrid clutch assembly for an aircraft of claim 1, wherein the electric motor and internal combustion engine operate in parallel to power the propeller independently.

3. The hybrid clutch assembly for an aircraft of claim 1, further comprising at least one drive belt to connect the motor pulley to the drive belt housing and transmit power between the electric motor and the drive belt housing.

4. The hybrid clutch assembly for an aircraft of claim 1, wherein the clutch flange adapter plate comprises a plurality of countersunk slots for receiving a plurality of flange bolts to attach the hybrid clutch to the engine propeller flange plate and so that the clutch flange adapter plate is mounted substantially flush against the engine propeller flange plate.

5. The hybrid clutch assembly for an aircraft of claim 1, wherein the drive belt housing comprises an inner collar diameter sized to substantially match a collar of the hybrid clutch assembly shaft.

6. The hybrid clutch assembly for an aircraft of claim 1, wherein an inner diameter of the drive belt housing is sized to exceed an outer diameter of the hybrid clutch in order to provide clearance and airflow circulation therebetween.

7. The hybrid clutch assembly for an aircraft of claim 1, wherein an outer diameter of the drive belt housing provides a required revolution per minute transmission from the motor pulley to the propeller shaft.

8. The hybrid clutch assembly for an aircraft of claim 1, further comprising a plurality of drive belt grooves positioned on the drive belt housing for positioning the drive belt housing with the motor pulley.

9. The hybrid clutch assembly for an aircraft of claim 1, wherein, when the internal combustion engine rotates to generate thrust with the propeller, the outer race of the hybrid clutch interlocks with the inner race so that the outer race and inner race rotate simultaneously.

10. The hybrid clutch assembly for an aircraft of claim 1, wherein the drive belt housing is coupled to the inner race of the clutch such that, when the electric motor rotates to generate thrust with the propeller, the inner race rotates independently of the outer race and power transmitted from the electric motor powers the propeller.

11. The hybrid clutch assembly for an aircraft of claim 1, wherein the clutch flange adapter plate comprises a front surface mounted substantially flush with the hybrid clutch; and an aft surface mounted substantially flush with the engine propeller flange.

12. The hybrid clutch assembly for an aircraft of claim 11, wherein an outer diameter of the clutch flange adapter plate is sized to be substantially equal to an outer diameter of the engine propeller flange.

13. A hybrid clutch assembly for an aircraft powered in parallel by an internal combustion engine and an electric motor, comprising:
    a drive belt housing coupled to the internal combustion engine and to the electric motor for transmitting power therefrom to a propeller drive shaft;
    a hybrid clutch mounted between the drive belt housing and the internal combustion engine and comprising an inner race and an outer race;
    a hybrid clutch assembly shaft comprising a keyway slot along a length thereof for receiving a keyway that interlocks the inner race of the hybrid clutch with the drive belt housing; and
    a clutch flange adapter plate configured to receive at least a portion of the hybrid clutch assembly shaft and connect the outer race of the hybrid clutch to an engine propeller flange plate of the internal combustion engine for transmitting power from the internal combustion engine to the drive belt housing.

14. The hybrid clutch assembly for an aircraft of claim 13, further comprising a snap ring configured to secure the hybrid clutch, drive belt housing, and flex disc assembly to the hybrid clutch assembly shaft.

15. The hybrid clutch assembly for an aircraft of claim 14, further comprising a bushing, a spline coupler, and a coupler centering hub mounted on one end of the hybrid clutch assembly shaft.

16. The hybrid clutch assembly for an aircraft of claim 15, wherein the propeller drive shaft is mounted in the spline coupler.

17. The hybrid clutch assembly of claim 13, further comprising a flex disc assembly that couples the propeller drive shaft to the drive belt housing.

18. A hybrid clutch assembly for an aircraft alternately powered independently by an internal combustion engine and/or an electric motor, comprising:
  a drive belt housing including a pulley for connecting the electric motor and internal combustion engine to a propeller driveshaft for transmitting power to a propeller of the aircraft;
  a hybrid clutch assembly shaft connected to the drive belt housing and configured to transmit power from the internal combustion engine and the electric motor to the drive belt housing;
  a hybrid clutch connected to the drive belt housing using the hybrid clutch assembly shaft and comprising an inner race and an outer race, wherein, when the inner race is rotated by operation of the electric motor, the inner race and drive belt housing rotate independently of the outer race, so that the propeller is driven by the electric motor independently of the internal combustion engine; and
  a clutch flange adapter plate connecting the outer race of the hybrid clutch to an engine propeller flange of the internal combustion engine for rotating the outer race and transmitting power from the internal combustion engine to the drive belt housing, wherein, when the internal combustion engine rotates the inner race of the hybrid clutch, the outer race is configured to interlock with the inner race so that the inner race is rotated therewith to power the propeller.

19. The hybrid clutch assembly for an aircraft of claim 18, further comprising a drive belt to connect a motor pulley coupled to the electric motor to the drive belt housing and transmit power between the electric motor and the drive belt housing.

20. The hybrid clutch assembly for an aircraft of claim 19, wherein the clutch flange adapter plate aligns the drive belt housing with the motor pulley.

21. The hybrid clutch assembly for an aircraft of claim 20, wherein the hybrid clutch assembly shaft comprises a keyway slot along a length thereof for receiving a keyway.

22. The hybrid clutch assembly for an aircraft of claim 21, wherein the hybrid clutch assembly shaft and keyway interconnect the inner race of the hybrid clutch with the drive belt housing and a flex disc assembly.

\* \* \* \* \*